(12) United States Patent
Tsai et al.

(10) Patent No.: US 11,059,384 B2
(45) Date of Patent: Jul. 13, 2021

(54) POWER DISTRIBUTION SYSTEM FOR VEHICLE LIGHTING

(71) Applicant: Ford Global Technologies, LLC, Dearborn, MI (US)

(72) Inventors: Tsung-Han Tsai, Pittsfield Township, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 16/059,624

(22) Filed: Aug. 9, 2018

(65) Prior Publication Data
US 2020/0047624 A1 Feb. 13, 2020

(51) Int. Cl.
*B60L 58/10* (2019.01)
*B60Q 1/50* (2006.01)
*B60Q 1/46* (2006.01)

(52) U.S. Cl.
CPC ............... *B60L 58/10* (2019.02); *B60Q 1/46* (2013.01); *B60Q 1/50* (2013.01)

(58) Field of Classification Search
CPC ... B60L 1/00; B60L 3/00; B60L 58/00; G05D 1/00; G05D 2201/00; B60Q 1/00
See application file for complete search history.

(56) References Cited

U.S. PATENT DOCUMENTS

| | | | |
|---|---|---|---|
| 6,728,614 B2 | 4/2004 | Matsubara et al. | |
| 6,885,920 B2* | 4/2005 | Yakes | B60L 15/06 701/22 |
| 8,405,498 B1* | 3/2013 | Smith | B60R 21/01 340/463 |
| 9,457,684 B2 | 10/2016 | Crombez et al. | |
| 9,517,715 B1* | 12/2016 | Sitarski | H05B 45/44 |
| 9,758,091 B2 | 9/2017 | Bolduc et al. | |
| 2015/0274027 A1* | 10/2015 | Crombez | B60L 58/18 701/22 |
| 2019/0013664 A1* | 1/2019 | Yasunori | H02J 7/1461 |
| 2019/0092257 A1* | 3/2019 | Boecker | H02J 7/0029 |
| 2019/0283609 A1* | 9/2019 | Symanow | B60L 3/0092 |
| 2019/0354786 A1* | 11/2019 | Lee | G05D 1/0088 |
| 2019/0366914 A1* | 12/2019 | Ochida | B60W 50/02 |
| 2019/0375298 A1* | 12/2019 | Symanow | B60L 1/00 |
| 2020/0001806 A1* | 1/2020 | Celinske | B60L 1/00 |
| 2020/0014240 A1* | 1/2020 | Boesch | B60R 16/03 |

FOREIGN PATENT DOCUMENTS

| | | |
|---|---|---|
| JP | 2015009584 A | 1/2015 |
| JP | 2015166213 A | 9/2015 |

OTHER PUBLICATIONS

Tecsup "Autonomous Lighting Systems", retrieved from the Internet URL: http://www.tecsup.fr/modeles-en/autonomous-lighting-systems (2 pages).

* cited by examiner

*Primary Examiner* — Hal Kaplan
*Assistant Examiner* — Joseph N Inge
(74) *Attorney, Agent, or Firm* — Frank A. MacKenzie; Bejin Bieneman PLC

(57) ABSTRACT

A system includes a first power net in a vehicle electrically coupled to a first control unit. The first control unit controls first lights included in a second light set when the first power net is operational. A second power net in the vehicle is electrically coupled to the second light set and a second control unit. The second control unit controls the first lights when the first power net includes a fault condition.

16 Claims, 4 Drawing Sheets

POWER DISTRIBUTION SYSTEM FOR VEHICLE LIGHTING

BACKGROUND

Some vehicles have a first power net to provide power to primary sub-systems provided for vehicle operation, and a second power net to provide power to secondary, or back-up sub-systems, such that, when there is a fault condition in the first power net, the vehicle continues to operate, at least long enough to bring the vehicle into a safe condition. For example, when there is a fault condition in the first power net, secondary sub-systems in the vehicle powered by the second power net may perform a minimum risk condition, wherein the vehicle drives to a safe location and stops.

DETAILED DESCRIPTION

Figure 1:
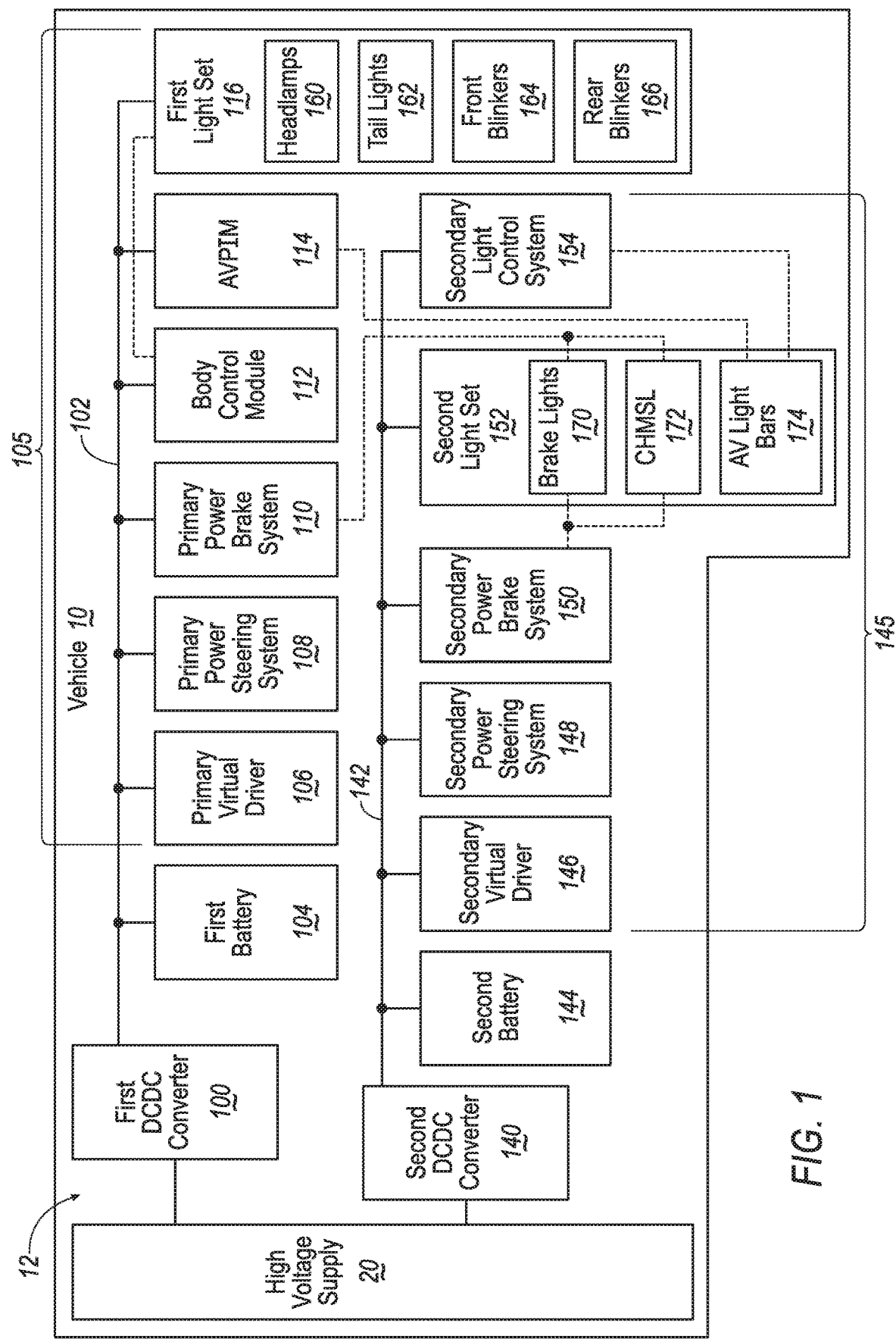
FIG. 1 is a block diagram of an example vehicle with the lighting system distributed over a first and second power net.

A system includes a first power net in a vehicle electrically coupled to a first control unit that controls first lights included in a second light set when the first power net is operational. The system further includes a second power net in the vehicle electrically coupled to the second light set and a second control unit that controls the first lights when the first power net includes a fault condition.

In the system, the first control unit can include a primary power brake system and the first lights can include at least one of brake lights or a center high mount stop lamp.

In the system, the first lights can include autonomous vehicle lights bars. The first power net can be electrically coupled to an autonomous vehicle platform module that controls the autonomous vehicle light bars when the first power net is operational.

In the system, the second power net can be electrically coupled to a secondary light control system programmed to control the autonomous vehicle light bars when the first power net includes a fault condition.

In the system, the secondary light control system can be included in one of the autonomous vehicle light bars.

The secondary light control system can cause the autonomous vehicle light bars to blink when the first power net includes a fault condition.

In the system, each of the autonomous vehicle light bars can include a secondary light control system.

In the system, the first power net can be further arranged to distribute power to a first light set, the first light set including at least one of headlamps, taillights, front blinkers or rear blinkers.

In the system, the second light set can include at least one of brake lights, a center high mount stop lamp or autonomous vehicle light bars.

In the system, the first power net can be further electrically coupled to a body control unit that controls at least one of headlamps, taillights, front blinkers or rear blinkers when the first power net is operational.

In the system, the first power net can be further electrically coupled to a primary power steering system that steers the vehicle based on commands from the primary virtual driver when the first power net is operational. The first power net can be electrically coupled to a primary virtual driver that controls vehicle steering by sending commands to the primary power steering system when the first power net is operational. The second power net can be electrically coupled to a secondary power steering system that steers the vehicle based on commands from the secondary virtual driver when the first power net includes a fault condition.

In the system, the second power net can be further electrically coupled to a secondary virtual driver configured to control vehicle steering when the first power net includes a fault condition by sending commands to the secondary power steering system. The secondary virtual driver can be operable to execute a minimum risk condition when the first power net includes a fault condition.

The vehicle can include at least one autonomous vehicle light bar on each of a front of the vehicle, a left side of the vehicle, and a right side of the vehicle.

The vehicle can further include at least one autonomous vehicle light bar on a rear of the vehicle.

A system includes a first power net in a vehicle electrically coupled to a primary power brake system that controls brake lights when the first power net is operational and a second power net in the vehicle electrically coupled and providing power to the brake lights and a secondary power brake system that controls the brake lights when the first power net includes a fault condition.

A system includes a first power net in a vehicle electrically coupled to an autonomous vehicle platform module that controls autonomous vehicle light bars when the first power net is operational and a second power net in the vehicle electrically coupled to the autonomous vehicle light bars and a secondary light control system that controls the autonomous vehicle light bars when the first power net includes a fault condition.

Distributing a vehicle lighting system over a first and second power net can provide a minimum set of lights when a first power net includes a fault condition. The vehicle can activate the minimum set of lights while performing the minimum risk condition, without the additional cost, weight and space requirements of back-up lighting. Thus, even if the vehicle does not include back-up lighting systems, the vehicle can avoid performing the minimum risk condition without illumination, thus alleviating risks due to other users of the road such as other vehicles, pedestrians, and cyclists, not being able to see the vehicle in dark conditions and reducing occupant discomfort caused by operating the vehicle in dark conditions.

As an example, the first power net can be electrically coupled, and can supply electrical power to, vehicle light systems such as head lamps, tail lights front blinkers and rear blinkers. The second power net can be electrically coupled to, and can supply electrical power to, brake lights. This configuration allows the brake lights to continue to operate in the case that there is a fault condition in the first power net.

A fault condition, as that term is used herein, is an abnormal condition or defect at the component, equipment, or sub-system level which may lead to a failure. Such failure may be identified by detecting, e.g., via sensors or diagnostic systems in the vehicle, that a system, subsystem or component is either not performing a function or performing the function out of specified performance parameters.

For example, vehicle sub-systems or components typically have operating parameters, i.e., values specifying physical limits or boundaries within which the component or subsystem can operate and/or can operate without comprising vehicle safety and/or damaging the vehicle component or subsystem or some other component or subsystem. For example, a power net may provide electrical power above a maximum specified voltage level or below a minimum specified voltage level. The overvoltage condition or undervoltage condition may be detected by sensors and reported to a computer overseeing or controlling operation of the power net. As another example, a power steering system may fail to actuate motors to steer the vehicle wheels. Sensors in the power steering system may detect that the wheels are not turned in response to, and/or as specified by, a steering command or detect that the actuator is consuming more or less than a specified amount of electrical power. The sensors may report this condition to a system that controls the power steering system.

As another example of providing lighting when there is a fault condition in the first power net, a vehicle capable of an autonomous mode of operation may include autonomous vehicle light bars (described in additional detail below). The second power net may supply power to the autonomous vehicle light bars. In the case that there is a fault condition in the first power net, the autonomous vehicle light bars may continue to operate.

In addition to providing power to some lights from the second power net, control for the lights can be provided from the second power net. For example, in the case of the brake lights, when there is a fault condition in the first power net, a primary power brake system, powered by the first power net, may also be non-operational. Non-operational, as that term is used herein, means that the system is not able to perform its assigned functions, either due to a lack of power provided to the system or being turned-off, and/or is experiencing a fault condition. A secondary power brake system, powered from the second power net, can be provided. The secondary power brake system can be programmed to assume control of vehicle brakes.

Similarly, when the first power net is operational, the autonomous vehicle light bars may be controlled, for example, by an autonomous vehicle platform module (AVPIM), powered by the first power net. In the case that there is a fault condition in the first power net, a back-up system, for example, a secondary light control system, powered from the second power net, can be programmed to assume control of the autonomous vehicle light bars. As described in additional detail below, the secondary light control system may be a stand-along system. Alternatively, one or more of the autonomous vehicle light bars may include a secondary light control system.

FIG. 1 is a block diagram of a vehicle 10 including a power distribution system 12. The power distribution system 12 includes a high-voltage power supply 20. The power distribution system further includes a first DCDC converter 100, a first power net 102, a first battery 104, a second DCDC converter 140, a second power net 142 and a second battery 144.

The vehicle 10 may be capable of autonomous, semi-autonomous and/or manual modes of operation. An autonomous mode is one in which the propulsion (typically via a powertrain including one or more electric motors and/or one or more internal combustion engines), braking, and steering are all controlled by one or more computers. A semi-autonomous mode is one in which at least one of vehicle propulsion, braking and steering are controlled by one or more computers as opposed to a human operator. A manual mode is defined as one in which each of vehicle propulsion, braking and steering are controlled by a human operator.

The high-voltage power supply 20 can convert chemical or mechanical energy to electrical energy and may include a generator or an alternator. The high-voltage power supply 20 is further arranged to output power to the first and second DCDC converters 100, 140 at a specified high voltage. For example, the high voltage may be specified, for example, to be in a range of 16 volts to 600 volts.

The first DCDC converter 100 can receive electrical power at the specified high voltage, and output electrical power at a specified low voltage via the first power net 102 to the first battery 104 and to a first set of loads 105. The specified low voltage may be, for example, in a range of 5 volts to 16 volts.

The first power net 102 includes an electrical conductor such as a wire or wire cable which may be included in a wire harness. The first power net 102 is electrically coupled to and can receive electrical power from the first DCDC converter 100. The first power net 102 is further electrically coupled, and provides power, to the first battery 104 and the first set of loads 105.

The first battery 104 may be, for example, a lithium-ion battery, or other rechargeable battery. The first battery 104 can be charged by the first DCDC converter 100. The first battery 104 can output electrical power to the first set of loads 105 when a first amount of electrical power output by the first DCDC converter 100 is less than a second amount of electrical power consumed by the first set of loads 105.

In an example, the first set of loads 105 includes some or all of a primary virtual driver 106, a primary power steering system 108, a primary power braking system 110, a body control module 112, a first light set 116, and an autonomous vehicle platform module (AVPIM) 114.

The primary virtual driver 106 is a computer such as an electronic control unit (ECU) or the like, programmed to communicate on a vehicle network such as a communications bus and, for example, receive data from sensors, send commands to and/or receive commands from another vehicle computer, etc. The primary virtual driver 106 is programmed to operate the vehicle 10 autonomously. As such, the primary virtual driver 106 is programmed to control steering and braking. Controlling steering and braking includes controlling, i.e., commanding actuation of, the primary power steering system 108 provided for steering the vehicle 10 and the primary power braking system 110 provided for braking the vehicle 10. Further, in the case that the primary power steering system 108 and/or primary power braking system 110 are non-operational, the primary virtual driver 106 may be programmed to control respectively the secondary power steering system 148 and/or secondary power brake system 150.

A system may be non-operational due to another system on a same power net having a fault condition that draws more than a maximum specified current for the system from the power net. This may result in the total current load being presented to the power net being greater than the power net is able to supply. In such cases, the power net may not be able to supply sufficient power to other systems on the power net, and/or maintain the power net at a voltage level specified to operate the other systems powered by the bus.

The primary power steering system 108 includes actuators, sensors and a computer, such as an electronic control unit (ECU) or the like, programmed to communicate on a vehicle network, e.g., communications bus, and, for example, send commands to and/or receive commands from another vehicle computer. The computer in the primary power steering system is programmed to steer the vehicle 10. That is, the computer is programmed to receive commands, for example from the primary virtual driver 106. Based on the commands, the primary power steering system 108 is programmed to control the actuators to steer the vehicle 10. The actuators include motors coupled to a steering rack to turn the wheels of the vehicle 10 from side-to-side. Turning the wheels from side-to-side, as used herein, means to change an angle of the wheels relative to a longitudinal axis of the vehicle 10 to direct a direction of travel of the vehicle 10.

Sensors in the primary power steering system 108 may include torque sensors, position sensors, current sensors, etc., that provide data related to the angle of the wheels with respect to the longitudinal axis of the vehicle 10 and torque experienced by the wheels to the computer. The computer may provide the sensor data to the primary virtual driver 106 indicating, for example, the wheel angle and the torque experienced by the wheels.

The primary power braking system 110 includes a computer, actuators and sensors. The power braking system 110 computer may be an electronic control unit (ECU) and is programmed to perform braking of the vehicle 10. That is, the computer is programmed to receive commands from, and provide data indicating a performance of the primary power brake system 110 to, the primary virtual driver 106 or secondary virtual driver 146. Based on the commands, the primary power brake system 110 controls the actuators to brake the wheels of the vehicle 10. The actuators may include motors, solenoids, pumps, etc., for generating brake pressure to apply to the wheels. The sensors may include pressure sensors, current sensors, temperature sensors, etc. The sensors collect data related to braking the vehicle 10 and provide the data to the computer. The computer may provide the sensor data, for example, to the primary virtual driver 106, indicating, for example, an amount of brake pressure currently being applied to wheels of the vehicle 10.

The first light set 116 can include headlamps, tail lights, front blinkers, rear blinkers, etc. The first light set 116 may include one or more computers, such as an electronic control unit (ECU) or the like, programmed to communicate on a vehicle bus, send commands to and/or receive commands from another vehicle computer and to control one or more of the lights included in the first light set 116.

The autonomous vehicle platform module (AVPIM) 114 is a computer. The AVPIM 114 may be programmed to perform one or more autonomous vehicle-specific functions, such as autonomous vehicle state management, trip management, passenger interaction and AV minimal risk condition management. Additionally, the AVPIM 114 may be programmed to control autonomous vehicle light bars (AV light bars) 174.

The second DCDC converter 140 can receive electrical power at the specified high voltage and output electrical power at the specified low voltage via a second power net 142 to a second battery 144 and a second set of loads 145. In an example, the second set of loads 145 includes a secondary virtual driver 146, a secondary power steering system 148, a secondary power braking system 150, a second light set 152, and a secondary light control system 154.

The second power net 142 may be an electrical conductor such as a wire or wire cable which may be included in a wire harness. The second power net 142 is electrically coupled to, and can receive electrical power from, the second DCDC converter 140. The first power net 102 is further electrically coupled, and can provide power, to the second battery 144 and the second set of loads 145.

The secondary virtual driver 146 is a computer and can operate the vehicle 10 autonomously. The secondary virtual driver 146 controls steering and braking. That is, the secondary virtual driver 146 is provided access and programmed to control the vehicle systems provided to operate the vehicle 10 autonomously when the primary virtual driver 106 is non-operational. For example, a computer, such as the computer included in the secondary virtual driver 146 may detect that the primary virtual driver 106 is non-operational. Based on the detection, the computer may assign the secondary virtual driver 146 access to the primary power steering system 108 and the primary power braking system 110 to operate the vehicle 10.

The secondary virtual driver 146 may be programmed to perform a minimum risk condition or other reduced set of driving operations. A minimum risk condition is a specified set of operations intended to bring the vehicle 10 into a safe condition. For example, the secondary virtual driver 146 may be programmed to execute a minimum risk condition to drive the vehicle 10 to the side of a road and stop the vehicle 10.

The computer in the secondary virtual driver 146 is programmed to control the primary power steering system 108 provided for steering the vehicle 10 and the primary power brake system 110 provided for braking the vehicle 10. When the primary power steering system 108 and/or primary power brake system 110 are non-operational, the secondary virtual driver 146 is further programmed to control the respective secondary power steering system 148 and/or secondary power brake system 150.

In some examples, the secondary virtual driver 146 is programmed only with a minimum risk condition specifying to coast the vehicle 10 to a location, e.g., a safe place off a roadway. That is, the secondary virtual driver 146 may be programmed to control steering and braking, and not to control propulsion, of the vehicle 10.

Sensors provide information to the secondary virtual driver 146 regarding the environment and the operating conditions of the vehicle 10. The sensors can include radar, lidar, cameras, ultrasonic sensors, microphones, temperature sensors, light sensors, etc. that provide data regarding the environment. The sensors further include accelerometers, gyroscopes, temperature sensors, pressure sensors, etc., that provide information regarding the operating conditions of the vehicle 10 such as velocity, acceleration, lateral acceleration, wheel speed, engine speed, etc. The sensors may be a limited set of sensors provided to perform the limited set of operations intended to bring the vehicle 10 into the safe condition.

The secondary power steering system 148 is programmed to perform steering of the vehicle 10. That is, the secondary power steering system 148 is programmed to receive instructions from the primary virtual driver 106 or secondary virtual driver 146 to control the steering of the vehicle 10 when the primary power steering system 108 is non-operational.

The secondary power steering system 148 includes a computer, actuators and sensors. In the case that the primary power steering system 108 is non-operational, the computer is programmed to receive instructions from and provide data to one of the primary virtual driver 106 or the secondary virtual driver 146. Based on the instructions, the primary power steering system 108 is programmed to control the actuators in the secondary power steering system 148 to steer the vehicle 10. The actuators include motors coupled to a steering rack to turn the wheels of the vehicle 10 from side to side. The primary power steering system 108 further includes sensors. The sensors may include torque sensors, position sensors, current sensors, etc., that provide data providing the angle of the wheels with respect to a longitudinal axis of the vehicle 10, and torque experienced by the wheels, to the computer. Based on the data received from the sensors, the computer in the secondary power steering system 148 may provide data to the primary virtual driver 106 or secondary virtual driver 146, indicating, for example, wheel angle and torque experienced by the wheels in the vehicle 10.

The secondary power braking system 150 is programmed to perform braking of the vehicle 10 in case the primary power braking system 110 is non-operational. The secondary power braking system 150 includes a computer, actuators and sensors. The computer is programmed to receive instructions from and provide data to the primary virtual driver 106 or the secondary virtual driver 146. Based on the instructions, the secondary power braking system 150 is programmed to control the actuators to brake the wheels of the vehicle 10. The actuators may include motors, solenoids, pumps, etc. for generating brake pressure to apply to the wheels. The sensors may include pressure sensors, current sensors, temperature sensors, etc. The sensors collect data related to braking the vehicle 10 and provide the data to the computer. The computer may be programmed to provide data to the primary virtual driver 106 or the secondary virtual driver 146 based on the data received from the sensors.

The second light set 152 can include brake lights, a center high mount stop lamp (CHMSL), and may further include autonomous vehicle light bars (AV light bars) 174. The brake lights are mounted on a rear 203 of the vehicle as is known. The center high mount stop lamp (CHMSL) is mounted in a middle of the rear 203 of the vehicle.

The AV light bars 174 are typically a lighting system to provide communications. A computer in the vehicle 10 may, for example, use the AV light bars 174 to interact with other road users such as vehicles, pedestrians, and bicyclists. The AV light bars 174 may include a computer which may be an electronic control unit (ECU) or the like, programmed to receive commands from the AVPIM 114. Based on the commands from the AVPIM 114, the computer in the AV light bars 174 may activate one or more lamps within the AV light bars 174. In a case that the AVPIM 114 is non-operational, for example, due to a loss of power on the first power net 102, the AV light bars may be controlled by the secondary light control system 154.

The secondary light control system 154 includes a computer. The computer is programmed to control the AV light bars 174 in a case that they are no longer controlled by the AVPIM. This may happen, for example, when there is a fault condition in the first power net 102. In some cases, the secondary light control system 154 may be an independent system that controls one or more of the AV light bars 174. In other cases, the secondary light control system 154 may be included in one of the AV light bars 174 and may provide control to one or more of the AV light bars 174. In yet other cases, each AV light bar 174 may include a secondary light control system 154, dedicated to control of the respective AV light bar 174, in case of loss of control from the AVPIM 114.

Figure 2:
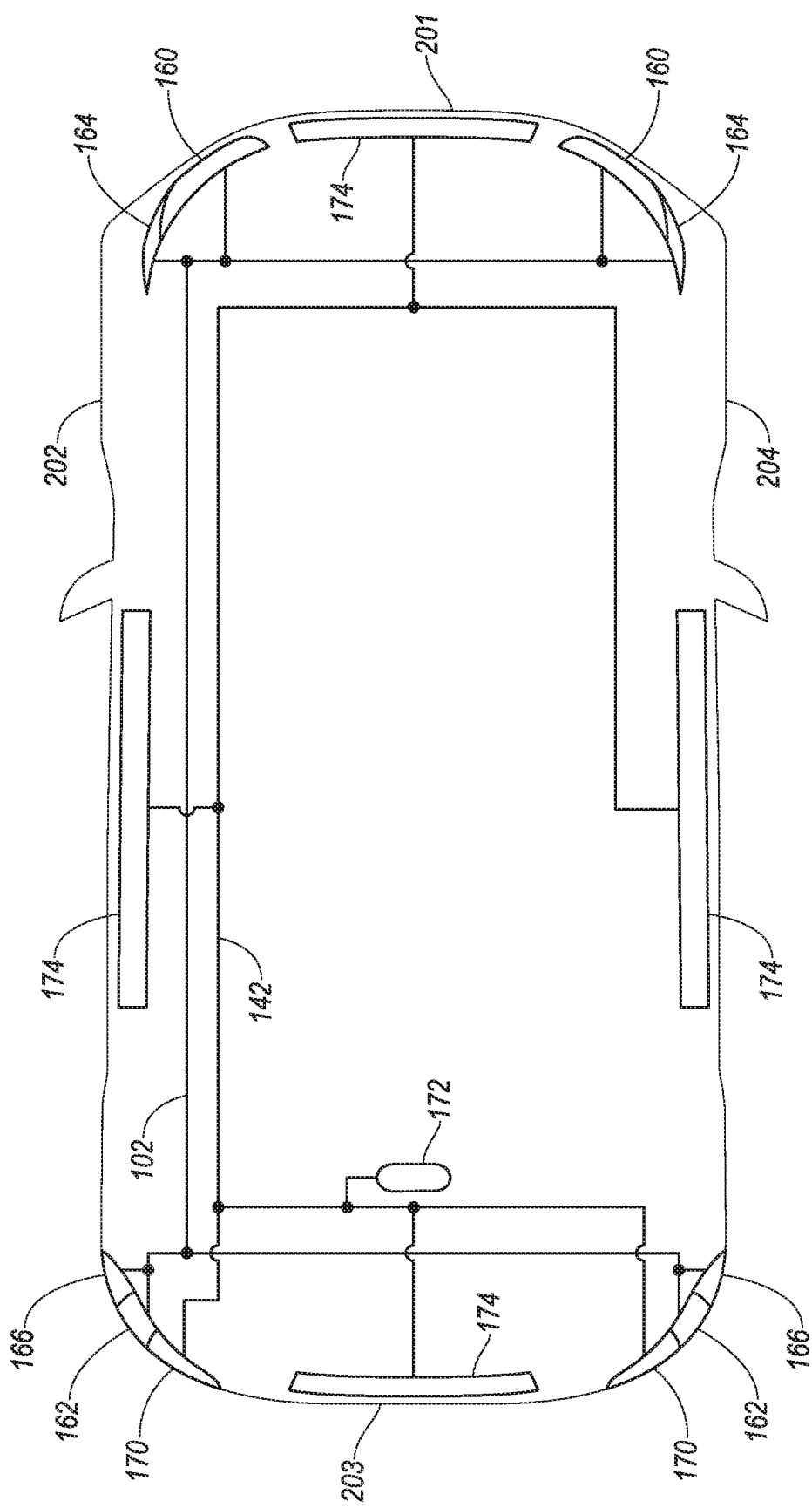
FIG. 2 is a top view of an example vehicle including lights and power nets.

FIG. 2 is a top view of an example vehicle 10, showing a location of the head lamps 160, tail lights 162, front blinkers 164, rear blinkers 166, brake lights 170, center high mount stop lamp (CHMSL) 172, and the AV light bars 174. The headlamps 160 and front blinkers 164 are located at a front 201 of the vehicle 10 at each side. The tail lights 162 and rear blinkers 166 are located at a back 203 of the vehicle 10 at respective sides thereof. The center high mount stop lamp (CHMSL) 172 is mounted in a center of the back 203 of the vehicle. The vehicle 10 may further include one or more AV light bars 174. In one example, the vehicle 10 includes four AV light bars 174, one each at the front 201, a left side 202, the back 203 and a right side 204 of the vehicle 10.

FIG. 2 further shows the first and second power nets 102, 142. In an example, the first power net 102 is electrically coupled and provides power to the headlamps 160, the tail lights 162, the front blinkers 164 and the rear blinkers 166. The second power net provides power to the brake lights 170, the center high mount stop lamp (CHMSL) 172 and the AV light bars 174.

Figure 3:
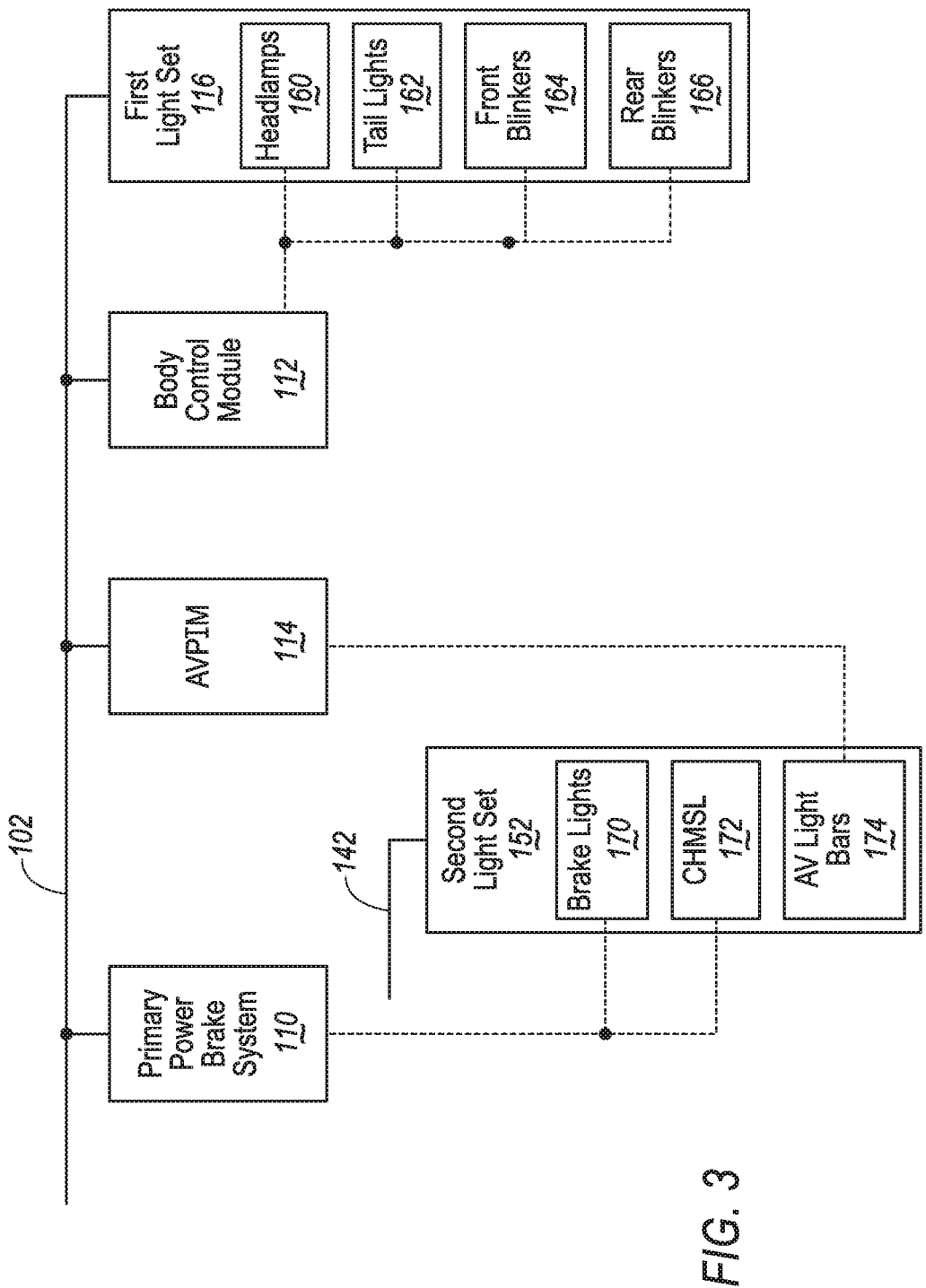
FIG. 3 is a block diagram illustrating an example of power distribution and control of a portion of lighting systems in a vehicle when the first power net is operational.

FIG. 3 illustrates power distribution and control for the first and second light sets 116, 152 when both the first power net 102 and the second power net 142 are operational. In this case, the first power net provides power to the first light set 116, including the head lamps 160, the tail lights 162, the front blinkers 164 and the rear blinkers 166. The body control module 112 also receives power from the first power net 102 and controls the head lamps 160, the tail lights 162, the front blinkers 164 and the rear blinkers.

As further shown in FIG. 3, the second light set 152, including the brake lights 170, center high mount stop lamp (CHMSL) 172 and AV light bars 174, receives power from the second power net 142. The brake lights 170 and center high mount stop lamp (CHMSL) 172, are controlled by the primary power brake system 110. The AV light bars 174 are controlled by the autonomous vehicle control module (AVPIM) 114.

Figure 4:
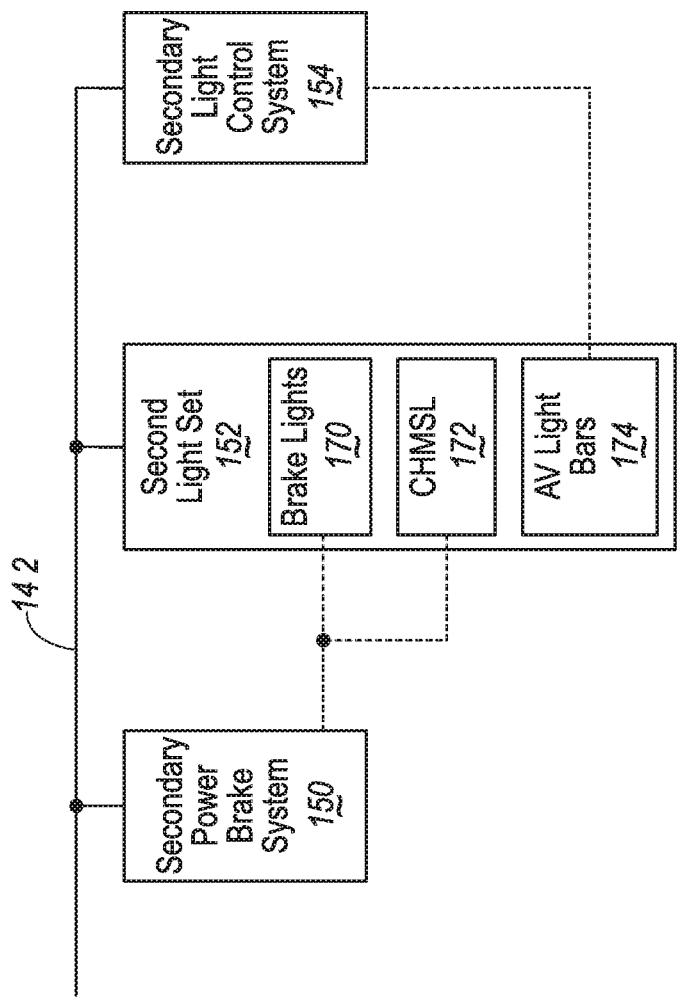
FIG. 4 is a block diagram illustrating an example of power distribution of the portion of lighting systems in the vehicle of FIG. 3 when there is a fault condition in the first power net.

FIG. 4 illustrates the power distribution and control for the second light set 152 in the case that there is a fault condition in the first power net 102. In this case, the primary power brake system 110, AVPIM 114, body control module 112 and first light set 116 (see FIG. 3) are not under power and not operational. The second power net 142 supplies power to the secondary power brake system 150, the secondary light control system 154 and the second light set 152. The secondary power brake system 150 controls the brake lights 170 and the CHMSL 172. In a case where the vehicle 10 includes and the secondary light control system 154 and the AV light bars 174, the secondary light control system 154 controls the AV light bars 174. As one example, the secondary light control system 154 may command the AV light bars 174 to blink, in order to alert other vehicles, pedestrians, bicyclists, etc. that the vehicle 10 is disabled.

Powering the brake lights 170 from the second power net 142 enables the vehicle 10 to activate lights at the rear 203 (FIG. 2) of the vehicle 10 when there is a fault condition in the first power net 102 without providing back-up lights. In a case where the vehicle 10 includes AV light bars 174, powering the AV light bars 174 from the second power net 142 enables the vehicle 10 to activate these additional lights to increase the visibility of the vehicle 10 in the case that there is a fault condition in the first power net 102, providing additional visibility of the vehicle 10. In a case where the AV light bars 174 are included on all four sides (front 201, left side 202, rear 203 and right side 204) of the vehicle 10, powering the AV light bars 174 from the second power net 142 enables the vehicle 10 to illuminate the four sides (front 201, left side 202, rear 203 and right side 204) of the vehicle 10.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers generally include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in one of the computers is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system comprising:
a first power net in a vehicle electrically coupled to a first light set including first lights, the first lights including at least one of headlamps, tail lights, front blinkers, or rear blinkers, and to a first computer programmed to control second lights included in a second light set when the first power net is operational, the second lights including at least one of autonomous vehicle light bars, brake lights, or a center high mount stop lamp; and
a second power net in the vehicle electrically coupled to the second light set and a second computer programmed to control the second lights when the first power net includes a fault condition;
wherein the first power net is further electrically coupled to a body control unit that is programmed to control at least one of the headlamps, the tail lights, the front blinkers or the rear blinkers when the first power net is operational.

2. The system of claim 1 wherein the first computer is included in a primary power brake system.

3. The system of claim 1, wherein the first power net is electrically coupled to an autonomous vehicle platform module, and the autonomous vehicle platform module includes the first computer that controls the autonomous vehicle light bars when the first power net is operational.

4. The system of claim 3, wherein the second power net is electrically coupled to a secondary light control system that includes the second computer programmed to control the autonomous vehicle light bars when the first power net includes a fault condition.

5. The system of claim 4, wherein the secondary light control system is included in one of the autonomous vehicle light bars.

6. The system of claim 4, wherein the secondary light control system causes the autonomous vehicle light bars to blink when the first power net includes a fault condition.

7. The system of claim 1, wherein each of the autonomous vehicle light bars includes a secondary light control system that includes the second computer.

8. The system of claim 1, wherein:
the first power net is further electrically coupled to a primary power steering system that steers the vehicle based on commands from a primary virtual driver when the first power net is operational.

9. The system of claim 8, wherein:
the first power net is electrically coupled to the primary virtual driver that controls vehicle steering by sending commands to the primary power steering system when the first power net is operational.

10. The system of claim 9, wherein:
the second power net is electrically coupled to a secondary power steering system that steers the vehicle based on commands from the secondary virtual driver when the first power net includes a fault condition.

11. The system of claim 10, wherein:
the second power net is further electrically coupled to a secondary virtual driver configured to control vehicle steering when the first power net includes a fault condition by sending commands to the secondary power steering system.

12. The system of claim 11, wherein:
the secondary virtual driver is operable to execute a minimum risk condition when the first power net includes a fault condition.

13. The system of claim 1, wherein the vehicle incudes at least one autonomous vehicle light bar on each of a front of the vehicle, a left side of the vehicle, and a right side of the vehicle.

14. The system of claim 13, wherein the vehicle further includes at least one autonomous vehicle light bar on a rear of the vehicle.

15. A system comprising:
a first power net in a vehicle electrically coupled to a first light set including at least one of headlamps, tail lights, front blinkers, or rear blinkers and to a primary power brake system that is programmed to control brake lights when the first power net is operational; and
a second power net in the vehicle electrically coupled and providing power to the brake lights and a secondary power brake system that is programmed to control the brake lights when the first power net includes a fault condition;
wherein the first power net is further electrically coupled to a body control unit that is programmed to control at least one of the headlamps, the tail lights, the front blinkers or the rear blinkers when the first power net is operational.

16. A system comprising:
a first power net in a vehicle electrically coupled to a first light set including at least one of headlamps, tail lights, front blinkers, or rear blinkers and to an autonomous vehicle platform module that is programmed to control autonomous vehicle light bars when the first power net is operational; and
a second power net in the vehicle electrically coupled to the autonomous vehicle light bars and a secondary light control system that is programmed to control the autonomous vehicle light bars when the first power net includes a fault condition;
wherein the first power net is further electrically coupled to a body control unit that is programmed to control at least one of the headlamps, the tail lights, the front blinkers or the rear blinkers when the first power net is operational.

* * * * *